(No Model.)
W. G. KENDALL.
CUSHION TIRE.
No. 604,663. Patented May 24, 1898.
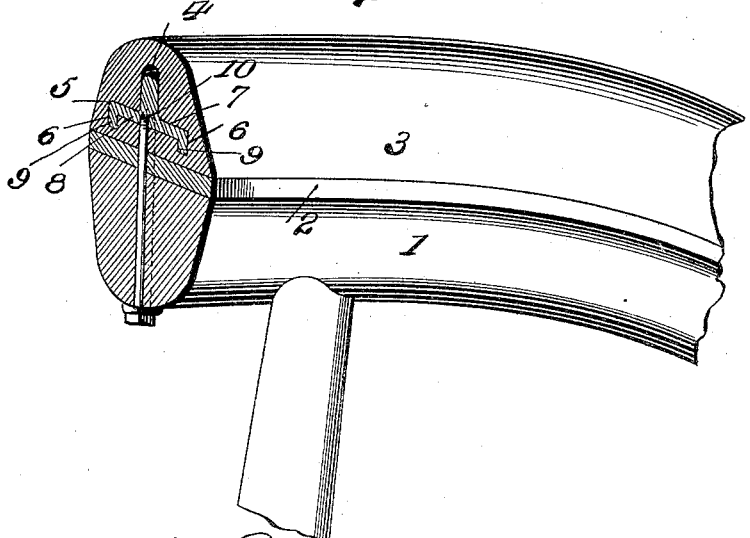
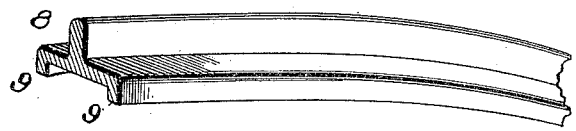
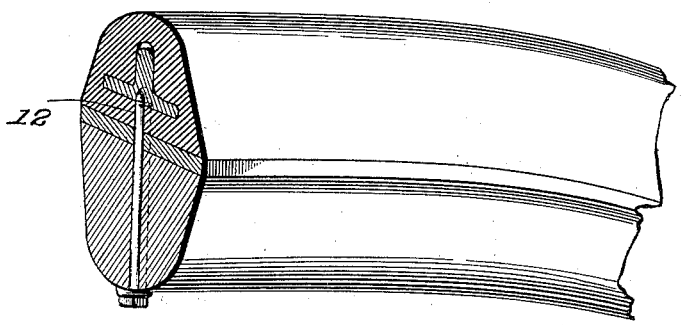
Witnesses
Inventor
W. G. Kendall
by J. R. Nottingham
Attorney
THE NORRIS PETERS CO., PHOTO-LITHO., WASHINGTON, D. C.

UNITED STATES PATENT OFFICE.

WEBBER G. KENDALL, OF PROVIDENCE, RHODE ISLAND, ASSIGNOR TO THE KENDALL RUBBER TIRE COMPANY, OF SAME PLACE.

CUSHION-TIRE.

SPECIFICATION forming part of Letters Patent No. 604,663, dated May 24, 1898.

Application filed December 23, 1897. Serial No. 663,136. (No model.)

*To all whom it may concern:*

Be it known that I, WEBBER G. KENDALL, a citizen of the United States, residing at Providence, in the county of Providence and State of Rhode Island, have invented certain new and useful Improvements in Cushion-Tires; and I do hereby declare the following to be a full, clear, and exact description of the invention, such as will enable others skilled in the art to which it appertains to make and use the same.

My invention relates to rubber tires and their application to wheels of vehicles; and it consists of a tire preferably modeled in two sections having an interior longitudinal cavity shaped like an inverted T in cross-section to receive a similarly-shaped steel band, which is provided with screw-threaded holes for the reception of the screw-threaded ends of suitable bolts, by means of which the rubber tire may be secured onto a metal-tired wheel, as will be hereinafter more fully described, and particularly set forth in the claims.

The principal object of the invention is to produce a rubber-tire wheel which may be readily applied to the ordinary metal-tired wheel now in use without the employment of specially-constructed rims or metal tires; and another object of the invention is to so form the interior cavity that a clamping-band of such peculiar shape may be employed as will relieve the weaker parts of the tire of all lateral strain and thereby consequent injury. These objects are attained by means of the mechanism illustrated in the accompanying drawings, in which—

Figure 1 is a cross-section of a portion of a wheel, showing my improved tire applied thereto; Fig. 2, a perspective view of a portion of the clamping-band; Fig. 3, a cross-section of a portion of a wheel, showing a modified form of my improved tire and clamping-band; and Fig. 4, a perspective view of a portion of the modified clamping-band.

Referring to the several views, the numeral 1 indicates a portion of the rim or felly of a wheel, and 2 the metal tire thereof.

The rubber tire 3 is composed, preferably, of two sections, each of which is modeled with an interior longitudinal cavity similar in shape to an inverted T in cross-section, with preferably a longitudinal channel or slot 4 opening from the inner periphery of the tire into the horizontal channel 5 of the cavity, at the center thereof. At each end of the channel 5 there is formed a depression 6, which, together with the horizontal portion 7 of said channel, forms a seat on opposite sides of the open channel or slot 4 for a clamping-band 8, which is also of inverted T shape in cross-section to correspond to the shape of the interior cavity of the rubber tire into which it is inserted. The clamping-band is provided with ribs 9, which set into the depressions 6, and with a series of screw-threaded holes 10, into which is screwed the securing-bolts 11, said bolts passing through suitable holes in the rim or felly and the metal tire up through the channel or slot 4.

To apply my improved rubber tire to a wheel, a section of the clamping-band, it being preferably made in two sections, is inserted into the cavity of a section of the tire and placed in position onto the wheel. The securing-bolts are then inserted through the holes in the rim or felly and the metal tire into the holes in the clamping-band and slightly tightened. The other section of tire, with its inclosed band-section, is then placed in position onto the wheel and the securing-bolts passed up through the holes in the rim or felly and metal tire as in the first section. All of the bolts are then thoroughly tightened to secure the tire firmly onto the wheel.

It will be noted that the vertical rib of the clamping-band sets well up into the vertical channel of the cavity, so that a rigid support is provided against lateral strain coming from either side of the tire.

In Figs. 3 and 4 I have shown a modified form of my improved tire and clamping-band. The channel or slot 4 is dispensed with, and in lieu thereof I have provided the inner periphery of the tire with a series of holes 12, which register with the holes in the felly and metal tire and through which pass the securing-bolts. By dispensing with the channel 4 I am enabled to also dispense with the depressions 6 at each end of the channel 5 and with the ribs 9 on the clamping-band, as all danger of the side edges of the tire spreading will be obviated.

Having thus described my invention, what I claim, and desire to secure by Letters Patent, is—

1. A rubber tire, having an interior longitudinal cavity of inverted-T shape, in cross-section, and provided with means opening from the inner periphery into said cavity for the passage of securing-bolts, in combination with a metal clamping-band, provided with a central rib to set into the vertical channel of the cavity, and bolts for securing the tire onto a wheel.

2. A rubber tire, having an interior longitudinal cavity of inverted-T shape, in cross-section, and provided with a channel or slot opening from the inner periphery into said cavity, in combination with a clamping-band, provided with a central rib adapted to set up into the vertical channel of the cavity and with depending ribs on its horizontal portion, and suitable bolts, whereby the tire may be secured onto a wheel.

In testimony whereof I affix my signature in the presence of two witnesses.

WEBBER G. KENDALL.

Witnesses:
J. R. NOTTINGHAM,
ALFRED S. WILLSON.